(12) United States Patent
Lefebvre et al.

(10) Patent No.: US 8,731,334 B2
(45) Date of Patent: May 20, 2014

(54) MULTILEVEL THRESHOLDING FOR MUTUAL INFORMATION BASED REGISTRATION AND IMAGE REGISTRATION USING A GPU

(75) Inventors: Alban Lefebvre, Ricarville du Val (FR); Guillaume Bousquet, Princeton, NJ (US); Christophe Chefd'hotel, Jersey City, NJ (US); Razik Yousfi, Drancy (FR)

(73) Assignee: Siemens Aktiengesellschaft, München (DE)

( * ) Notice: Subject to any disclaimer, the term of this patent is extended or adjusted under 35 U.S.C. 154(b) by 964 days.

(21) Appl. No.: 12/509,740

(22) Filed: Jul. 27, 2009

(65) Prior Publication Data

US 2010/0027911 A1    Feb. 4, 2010

Related U.S. Application Data

(60) Provisional application No. 61/085,946, filed on Aug. 4, 2008.

(51) Int. Cl.
*G06T 1/20* (2006.01)
*G06T 3/00* (2006.01)
*G06T 7/00* (2006.01)

(52) U.S. Cl.
USPC ........... 382/294; 382/131; 382/132; 382/170; 382/171; 382/172; 382/173

(58) Field of Classification Search
CPC ....... G06T 1/20; G06T 3/0068; G06T 7/0024; G06T 7/0026; G06T 2207/30004; G06K 9/6212

USPC .......... 382/294, 131, 132, 170, 171, 172, 173
See application file for complete search history.

(56) References Cited

U.S. PATENT DOCUMENTS

| | | | | |
|---|---|---|---|---|
| 5,579,360 | A * | 11/1996 | Abdel-Mottaleb | 378/37 |
| 5,974,165 | A * | 10/1999 | Giger et al. | 382/132 |
| 6,728,424 | B1 * | 4/2004 | Zhu et al. | 382/294 |
| 7,706,663 | B2 * | 4/2010 | Huang et al. | 386/343 |
| 8,538,108 | B2 * | 9/2013 | Shekhar et al. | 382/131 |
| 2004/0071325 | A1 * | 4/2004 | Declerck et al. | 382/128 |
| 2005/0013471 | A1 * | 1/2005 | Snoeren et al. | 382/131 |
| 2005/0163360 | A1 * | 7/2005 | Snoeren et al. | 382/132 |
| 2006/0098897 | A1 * | 5/2006 | Dewaele | 382/294 |

OTHER PUBLICATIONS

Liao, et al. "A Fast Algorithm for Multilevel Thresholding." Journal of Information Science and Engineering. 17. (2001): 713-727. Print.*

(Continued)

*Primary Examiner* — Michael A Newman
(74) *Attorney, Agent, or Firm* — Donald B. Paschburg; F. Chau & Associates, LLC

(57) ABSTRACT

An exemplary embodiment of the present invention includes a method of registering images. The method includes: for each image, determining an optimum intensity threshold set from a plurality of intensity threshold sets that maximizes a variance between classes of each set, segmenting each image using the corresponding determined optimum intensity threshold set, generating mutual information from a joint histogram of at least two of the segmented images, and registering the at least two images using the mutual information. The joint histogram may be generated using a geometry shader of a graphical processing unit.

23 Claims, 10 Drawing Sheets

(56) References Cited

OTHER PUBLICATIONS

Shams, et al. "Speeding up Mutual Information Computation Using NVIDIA CUDA Hardware." Digital Image Computing Techniques and Applications. 9. (2007): 555-560. Print.*

Diard, Franck. "Chapter 41—Using the Geometry Shader for Compact and Variable-Length GPU Feedback." Trans. Array GPUGems 3. Hubert Nguyen. 1. Boston: Addison-Wesley, 2007. 891-907. Web. Feb. 24, 2013. <http://http.developer.nvidia.com/GPUGems3/gpugems3_ch41.html>.*

Maes, et al. "Multimodality Image Registration by Maximization of Mutual Information." IEEE Transactions on Medical Imaging. 16.2 (1997): 187-198. Print.*

Liao et al. "A Fast Algorithm for Multilevel Thresholding." Journal of Information Science and Engineering. 17. (2001): 713-727. Print.*

Blythe, et al. "Rise of the Graphics Processor." Proceedings of the IEEE. 96.5 (2008): 761-778. Print.*

Chisu, Razvan. Techniques for Accelerating Intensity-based Rigid Image Registration. Diss. Technical University of Munich, 2005. Print.*

Ping-Sung Liao, et al., "A Fast Algorithm for Multilevel Thresholding", Journal of Information Science and Engineering 17, 713-727 (2001).; Magazine.

C. Studholme et al., "An overlap invariant entropy measure of 3D medical image alignment", Pattern Recognition 32 (1197) 71-86; Magazine; (1997).

Frederik Maes et al., "Multimodality Image Registration by Maximization of Mutual Information", IEEE Transactions on Medical Imaging, vol. 16, No. 2, Apr. 1997; Magazine.

William M. Wells III. et al., "Multi-modal volume registration by maximization of mutual information", Medical Image Analysis (1996) vol. 1, No, 1, pp. 35-51.; Magazine.

* cited by examiner

```
POINT geometry_shader (InputCoordinate input, Transformation t, Texture3D r, Texture3D m)
{
    input_projection = mul (t, input);
    if (input_projection in [0 .. 1])
    {
        color1 = texture3D (r, input);
        color2 = texture3D (m, input_projection);
        emitVertex (color1, color2, 1);
    }
}
```

FIG. 8

MULTILEVEL THRESHOLDING FOR MUTUAL INFORMATION BASED REGISTRATION AND IMAGE REGISTRATION USING A GPU

CROSS-REFERENCE TO RELATED APPLICATIONS

This application claims priority to U.S. Provisional Application No. 61/085,946, filed on Aug. 4, 2008, the disclosure of which is incorporated by reference herein.

BACKGROUND OF THE INVENTION

1. Technical Field

The present disclosure relates to image registration, and more particularly, to image registration using mutual information and image registration using a GPU.

2. Discussion of Related Art

Medical imaging is increasingly being used for identification of medical problems for patients. Image registration is a component of post-processing medical images. Image registration typically consists of finding a geometric transformation that aligns a pair of images or volumes. The geometric transformation can be used to compensate for motion, detect changes, or fuse complementary information provided by different acquisition devices. Proposed conventional methods for such transformations range from feature based techniques, which establish correspondences between geometric features extracted from images, to intensity-based approaches.

In intensity-based approaches, image registration typically consists of maximizing an image similarity measure over a set of geometric transformations. In the context of multimodal registration, statistical similarity measures such as Mutual Information (MI) and Normalized Mutual Information (NMI) have proven to be effective image similarity measures. The mutual information of two variables is a quantity that measures the statistical dependence between two random variables.

In the context of image registration, mutual information may be computed from a joint intensity histogram of a pair of images In a typical implementation, image intensities are often uniformly quantized to obtain a joint histogram of a practical size. This strategy does not take into account the non-uniform distribution of intensities often encountered in most medical datasets, and results in a very sparse joint histogram where the joint intensity content has been aggregated in a few histogram bins. For example, in brain images, a disproportionate number of values are located in the first quarter of the joint histogram (e.g., the low intensities) due to the predominance of the background.

The processor of a computer may be used to calculate the joint intensity histogram, derive the mutual information from the calculated histogram, and perform image registration from the derived mutual information. However, such operations are computationally expensive. With these CPU-based implementations, it is typical to use various approximations to maintain reasonable computation times. This may however result in suboptimal alignments.

A CPU can offload calculations and operations associated with graphical rendering to a specialized processor known as a Graphical Processing Unit (GPU). While a GPU is not designed to perform operations related to image registration, workarounds have been developed to cause the GPU to assist or perform image registration. However, conventional workarounds do not make use of a geometry shader, which is available on many modern GPUs, such as the NVIDIA's GeForce 8 architecture.

Thus, there is a need for methods and systems that can more efficiently perform image registration and segmentation when the distribution of intensities in medical datasets is non-uniform, and methods and systems that can more efficiently make use of a GPU to perform image registration.

SUMMARY OF THE INVENTION

An exemplary embodiment of the present invention includes a method of registering images. The method includes: for each image, determining an optimum intensity threshold set from a plurality of intensity threshold sets that maximizes a variance between classes of each set, segmenting each image using the corresponding determined optimum intensity threshold set, generating mutual information from a joint histogram of at least two of the segmented images, and registering the at least two images using the mutual information.

An exemplary embodiment of the present invention includes a method of segmenting an image. The method includes: computing a variance between a first group of intensity ranges that cover all of the intensities of the image, computing a variance between a second group of intensity ranges that cover all of the intensities of the image that differs from the first group, selecting the group of intensity ranges that has a higher variance, and generating a segmented image using the intensity ranges of the selected group.

An exemplary embodiment of the present invention includes a method of visualizing a plurality of images. The method includes: for each image, determining an optimum intensity threshold set from a plurality of intensity threshold sets that maximizes a variance between classes of each set, segmenting each image using the corresponding determined optimum intensity threshold set, and displaying the segmented images.

An exemplary embodiment of the present invention includes a system for registering images. The system includes a segmentation unit and a registration unit. The segmentation unit is configured to compute a variance between different sets of intensity ranges for each one of the images, select the set having the highest variance for each image, and segment the image using the intensity ranges of the selected set. The registration unit is configured to generate mutual information from a joint histogram of at least two of the segmented images and register the at least two images using the mutual information.

An exemplary embodiment of the present invention includes a method of performing image registration. The method includes: uploading a first image volume and a second image volume from memory of a central processing unit (CPU) into memory of a graphical processing unit (GPU), mapping each coordinate point of the first volume to a mapped coordinate point in the second volume based on a given transformation by a geometry shader of the GPU, determining vertices from joint pairs of an intensity of each first volume coordinate point and an intensity of each corresponding mapped coordinate point by the geometry shader, outputting the vertices to a frame buffer object of the GPU by the geometry shader to generate a joint histogram, and registering the first volume with the second volume using the generated joint histogram.

An exemplary embodiment of the present invention includes a method for generating a joint intensity histogram. The method includes mapping each coordinate point of a first volume to a mapped coordinate point in a second volume based on a given transformation using a geometry shader of a graphical processing unit (GPU), determining vertices from intensities of each first volume coordinate point and intensities of each corresponding mapped coordinate point using the geometry shader, and outputting the vertices to a frame buffer object of the GPU by the geometry shader to generate the joint intensity histogram. The frame buffer object is configured to perform additive updates.

BRIEF DESCRIPTION OF THE DRAWINGS

Exemplary embodiments of the invention can be understood in more detail from the following descriptions taken in conjunction with the accompanying drawings in which:

FIG. 8 illustrates exemplary pseudocode of a function that may be used in the method of FIG. 7;

DETAILED DESCRIPTION OF EXEMPLARY EMBODIMENTS

In general, exemplary embodiments of systems and methods for registering images, segmenting images, and calculating joint histograms for use in registering images will now be discussed in further detail with reference to FIGS. 1-10. This invention may, however, be embodied in different forms and should not be construed as limited to the embodiments set forth herein. Rather, these embodiments are provided so that this disclosure will be thorough and complete, and will fully convey the scope of the invention to those skilled in the art.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
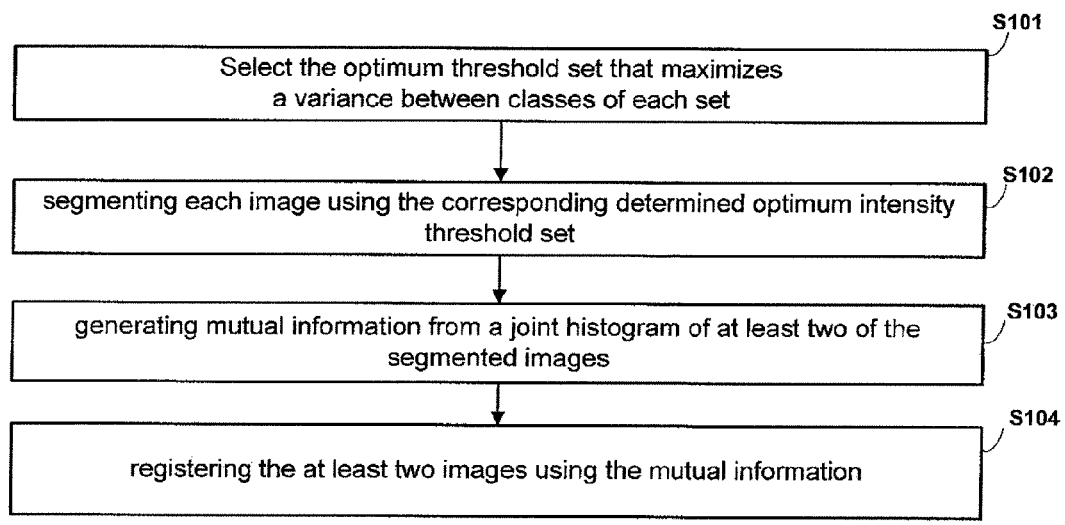
FIG. 1 illustrates a high-level flow chart of a method of registering images, according to an exemplary embodiment of the present invention.

FIG. 1 illustrates a high-level flow chart of a method of registering images, according to an exemplary embodiment of the present invention. Referring to FIG. 1, for each image, the method includes: determining an optimum intensity threshold set from a plurality of intensity threshold sets that maximizes a variance between classes of each set (S101), segmenting each image using the corresponding determined optimum intensity threshold set (S102), generating mutual information from a joint histogram of at least two of the segmented images (S103), and registering the at least two images using the mutual information (S104).

The above method will be discussed using an example that assumes input images have N pixels with gray (e.g., intensity) levels ranging from 1 to L, where N and L are positive integers. The number of pixels with a gray level i is denoted a frequency $f_i$ and a probability $p_i$ of each gray level i may be represented by equation 1 as follows:

$$p_i = f_i/N. \quad (1)$$

An intensity threshold set includes at least one intensity threshold value t and divides an original image into M classes: $C_1$ for $[1, \ldots, t_1], \ldots, C_i$ for $[t_{i-1}, \ldots, t_i]$, and $C_M$ for $[t_{M-1}+1, \ldots, L]$. For example, if L is 9, then an example of an intensity threshold set could be $\{3, 5, 7\}$, which could result in classes of $C_1$ with intensity range [1-3], $C_2$ with intensity range [4-5], $C_3$ with intensity range [6-7], and $C_4$ with intensity range [8-9]. Use of different combinations of threshold numbers can be used to generate a multitude of different intensity threshold sets. Referring back to step (S101), the optimal threshold set $\{t_1^*, t_2^*, \ldots, t_{M-1}^*\}$ is the one that maximizes the between-class variance. The following equation 2 may be used to represent the optimal threshold set.

$$\{t_1^*, t_2^*, \ldots, t_{M-1}^*\} = \arg\max_{1 \le t_1 < t_{M-1} < L} \{\sigma_B^2(t_1, t_2, \ldots, t_{M-1})\}, \quad (2)$$

where the between-class variance $\sigma_B^2$ may be represented by equation 3 as follows:

$$\sigma_B^2 = \sum_{k=1}^{M} \omega_k (\mu_k - \mu_T)^2. \quad (3)$$

The parameter $\omega_k$ of equation 3 may be represented by equation 4 as follows:

$$\omega_k = \sum_{i \in C_k} p_i. \quad (4)$$

The parameter $\omega_k$ may be referred to as a class occurrence probability since it is a sum of the probabilities of the gray levels for a corresponding intensity range class.

The parameter $\mu_k$ of equation 3 may be represented by equation 5 as follows:

$$\mu_k = \sum_{i \in C_k} \frac{ip_i}{\omega_k}. \tag{5}$$

The parameter $\mu_k$ may be referred to as a class mean level. The parameter $\mu_T$ of equation 3 may be represented by equation 6 as follows:

$$\mu_T = \sum_{i=1} ip_i. \tag{6}$$

The parameter $\mu_T$ may be referred to as a global mean.

In this way, a between-class variance is generated for each intensity threshold set and the intensity threshold set that has the highest corresponding variance is the optimum intensity threshold set. Equation 2 obtains the optimal threshold set via an exhaustive search. However, such a search may be time consuming, especially when multiple levels are present.

In an alternate embodiment of the present invention, a modified between-class variance $\sigma'^2_B$ is maximized that does not require calculation of the global mean $\mu_T$. The modified between-class variance $\sigma'^2_B$ may be represented by equation 7 as follows:

$$\sigma'^2_B = \sum_{k=1}^{M} \omega_k \mu_k^2. \tag{7}$$

In a further optimization, the search space of the optimum threshold set may be constrained under the following assumptions: (1) the thresholds are sorted, and (2) two thresholds cannot have the same value. The search space may then be represented by $1 \leq t_1 < L-M+1$, $t_1+1 \leq t_2 < L-M+2$, ... and $t_{M-2}+1 \leq t_{M-1} < L-1$. Lookup tables can also be used for the values of $\omega_k$ and $\mu_k$, which may result in a significant performance improvement. In this way, subsequent executions of the above equations can use pre-computed values of $\omega_k$ and $\mu_k$, enabling the between class variance calculations to reduce to a simple sum of pre-computed values.

As a further optimization, instead of generating one set of thresholds, computing its variance and iterating, an arbitrary number of threshold combinations may be generated, and the computations can then be performed in parallel.

Figure 2:
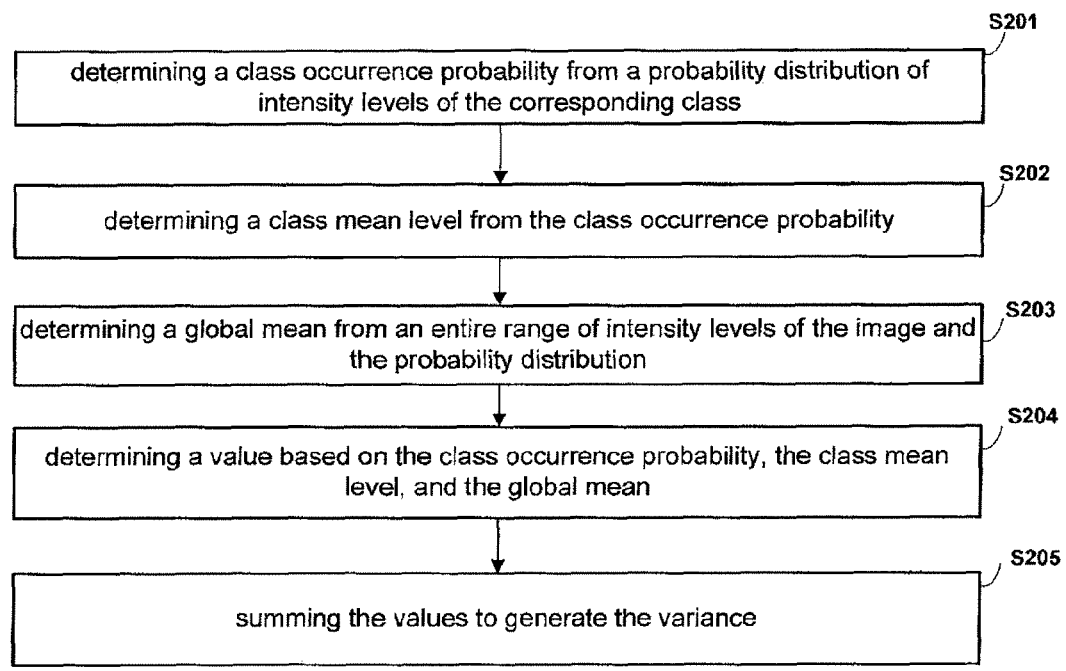
FIG. 2 illustrates a high-level flow chart of a method of generating between-class variance according to an exemplary embodiment of the present invention.

The generation of the between-class variance may be illustrated by a method shown in FIG. 2. Referring to FIG. 2, the method includes, for each class, determining a class occurrence probability from a probability distribution of intensity levels of the corresponding class (S201), determining a class mean level from the class occurrence probability (S202), determining a global mean from an entire range of intensity levels of the image and the probability distribution (S203), determining a value based on the class occurrence probability, the class mean level, and the global mean (S204), and summing the values to generate the variance (S205).

The determining of the value may include subtracting the global mean from the class mean level, squaring a result of the subtraction, and multiplying a result of the squaring by the class occurrence probability to generate the value.

The probability distribution may be determined by determining a frequency of occurrence of each gray level in the image, determining a probability for each frequency by dividing the frequency by the number of pixels of the image, and summing all of the probabilities to generate the probability distribution.

The determining of the class mean level from the class occurrence probability may include determining a value for each intensity level by multiplying the intensity level by the corresponding probability divided by the probability distribution, and summing each of the values to generate the class mean level.

The determining of the global mean may include determining a value for each intensity level in the entire range by multiplying each intensity level by a probability of the intensity level occurring in the image, and summing each of the values to generate the global mean.

Figure 3:
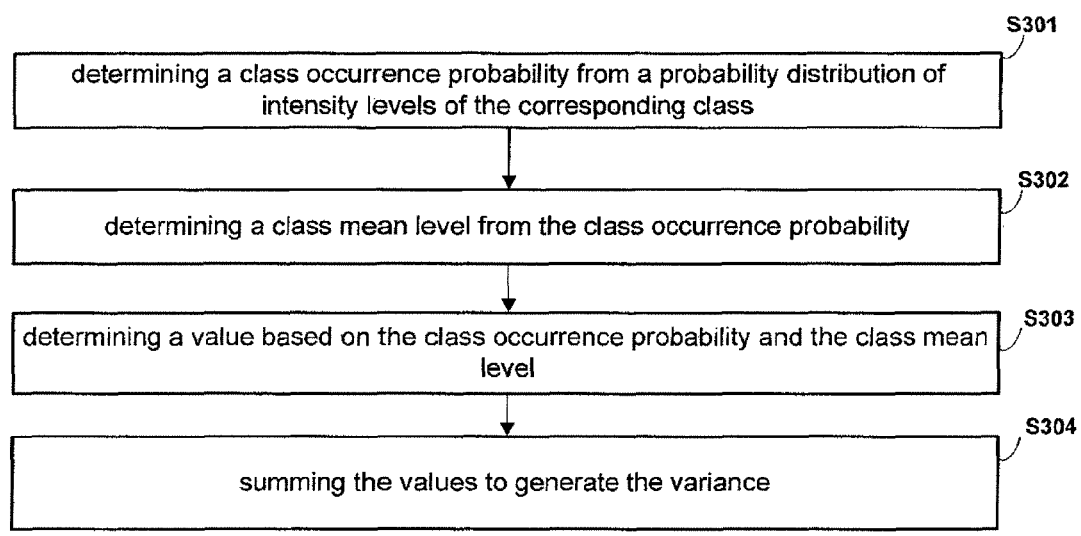
FIG. 3 illustrates a high-level flow chart of a method of generating a variant of the between-class variance of FIG. 2, according to an exemplary embodiment of the present invention.

The generation of the modified between-class variance may be illustrated by a method shown in FIG. 3. Referring to FIG. 3, the method includes, for each class, determining a class occurrence probability from a probability distribution of intensity levels of the corresponding class (S301), determining a class mean level from the class occurrence probability (S302), determining a value based on the class occurrence probability and the class mean level (S303), and summing the values to generate the variance (S304). The determining of the value may include squaring the class mean level, and multiplying a result of the squaring by the class occurrence probability to generate the value.

Figure 4:
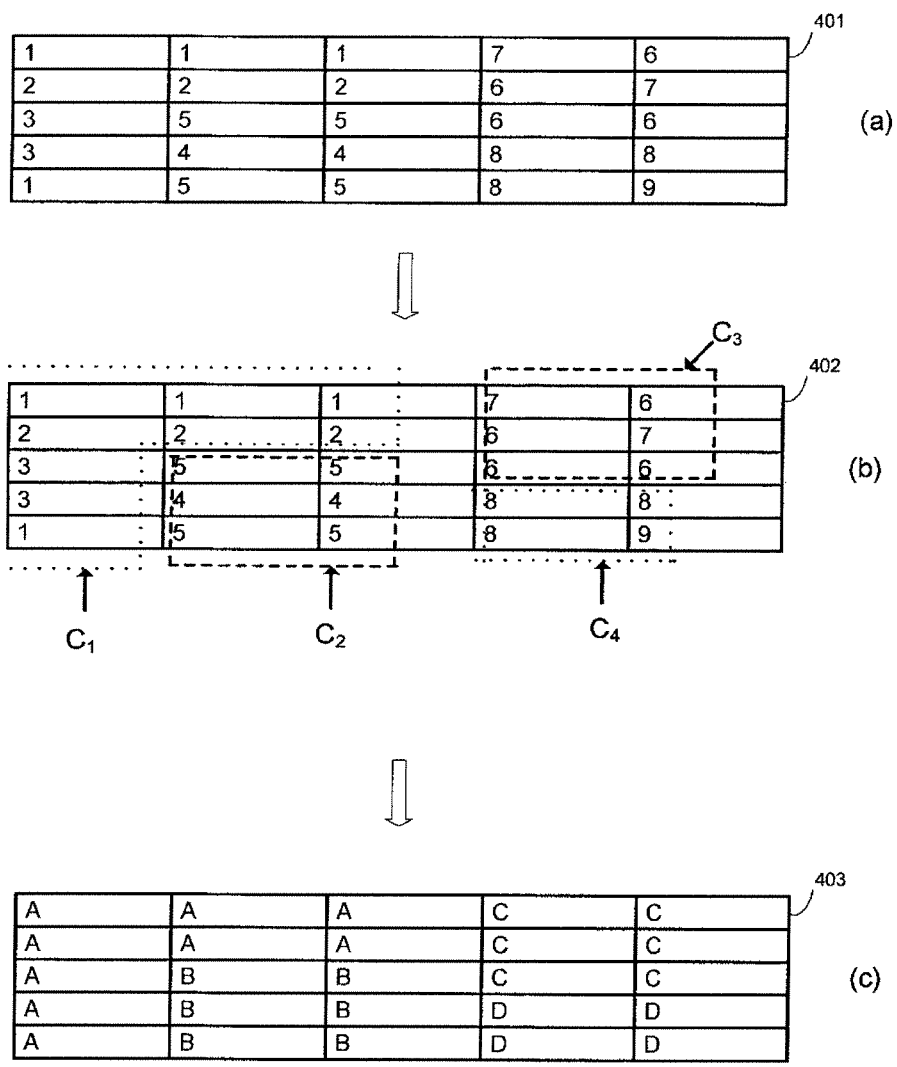
FIG. 4 illustrates an example of an image segmentation that may result from a segmentation performed on an image using a method of segmenting images according to an exemplary embodiment of the present invention.

Once an optimum intensity threshold set for each image has been determined, the sets can be used to segment each corresponding image. FIG. 4 illustrates an example of performing a segmentation on an image using a determined optimum intensity threshold set. For example, assume the optimum threshold set is {3, 5, 7} with classes class $C_1$ of intensity range [1-3], $C_2$ of intensity range [4-5], $C_3$ of intensity range [6-7], and $C_4$ of intensity range [8-9]. The first image (a) of FIG. 4 shows the original image 401. The second image (a) of FIG. 4 shows the segmented image 402, where the dotted and dashed regions each correspond to the different classes. The third image (c) of FIG. 4 shows a simplified segmented image 403, where each of the pixels that are common to a class have been replaced with a unique letter, such as A-D. Each of the letters may be correspond to a single intensity value. For example, the intensity value could be the average of the intensities of the pixels of a class. However, the intensity value need not be based on intensities of the pixels of a class. For example, if only two classes were present, then the pixels of one class could be arbitrarily black, while the pixels of the other class could be arbitrarily white. Further, assume that the above segmentation was performed on a second image to generate a second simplified segmented image 403. The segmented images may then be visualized on a display for use by a healthcare professional.

Referring back to step (S103), a joint histogram could then be generated from both simplified segmented images 403 and mutual information could be extracted from the joint histogram. Referring back to step (S104), the images could then be registered with one another using the mutual information. The registered images could then be visualized on the display.

Figure 5:
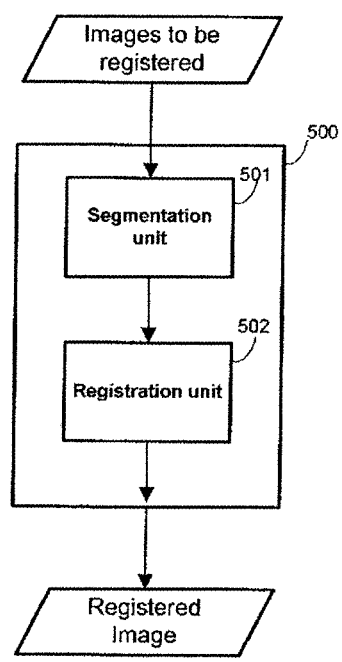
FIG. 5 illustrates a system that performs image registration on images according to an exemplary embodiment of the present invention.

FIG. 5 illustrates a system 500 for segmenting and registering images according to an exemplary embodiment of the present invention. The system 500 includes a segmentation unit 501 and a registration unit 502. The segmentation unit 501 is configured to compute a variance between different sets of intensity ranges for each one of the images, select the set having the highest variance for each image, and segment the image using the intensity ranges of the selected set. The registration unit 502 is configured to generate mutual information from a joint histogram of at least two of the segmented images and register the at least two images using the mutual information. The system may further include lookup tables to store values that may be pre-computed, such as class occurrence probabilities, global means, etc.

At least one exemplary embodiment of the present invention can produce a more robust estimate of mutual information, which can in turn lead to an improved registration capture range (e.g., by reducing the number of local minima in a similarity profile). Further, at least one exemplary embodiment of the present invention can reduce overall computation time by making using of smaller histograms. The smaller histograms can in turn reduce the computation time of mutual information criteria.

Figure 6:
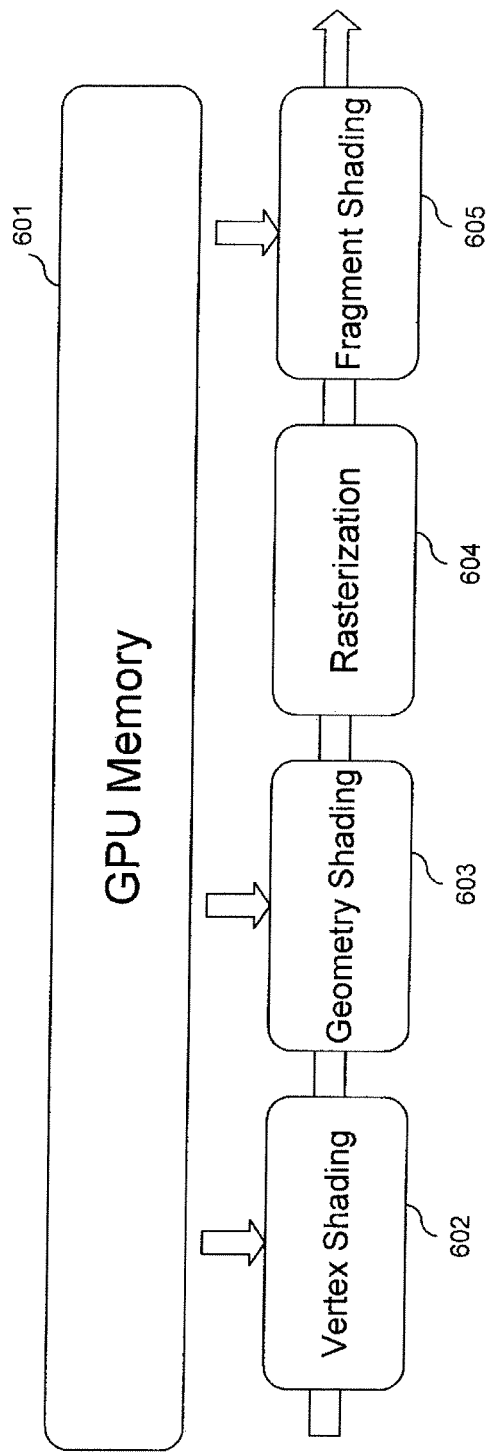
FIG. 6 illustrates a pipeline of a GPU.

The registration operations or calculations described above, such as segmentation, determination of mutual information, determination of joint histograms, etc., may be performed by an ordinary CPU of a computer. However, it can be more efficient to offload some or all of these operations or calculations to a GPU. As discussed above, conventional methods do not employ the geometry shader of the GPU in these operations or calculations. For example, FIG. 6 illustrates a pipeline of a conventional GPU. The GPU includes GPU memory 601, and its pipeline may include a vertex shading stage 602 performed by a vertex shader (not shown), a geometry shading stage 603 performed by a geometry shader (not shown), a rasterization stage 604 performed by a rasterizer (not shown), and a fragment shading stage 605 performed by a fragment shader (not shown).

Figure 7:
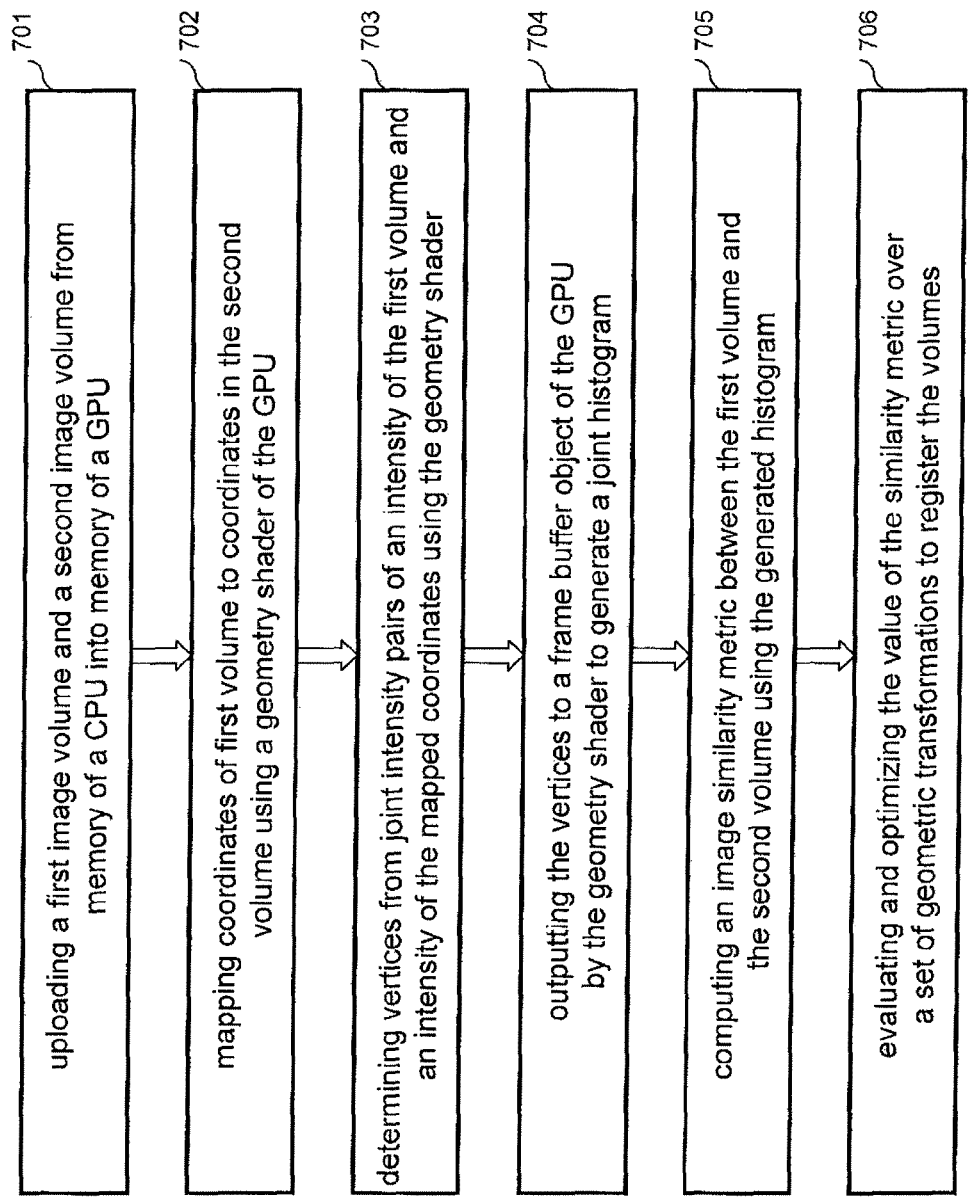
FIG. 7 illustrates a method of registering volumes, according to an exemplary embodiment of the present invention.

FIG. 7 illustrates a high-level flow chart of a method of performing image registration, according to an exemplary embodiment of the present invention. Referring to FIG. 7, the method includes: uploading a first image volume and a second image volume from memory of a CPU into memory of a GPU (S701), mapping each coordinate of the first volume to a mapped coordinate in the second volume based on a given transformation by a geometry shader of the GPU (S702), determining output point primitives from intensities of the two volumes located at the first volume coordinate and the mapped volume coordinate by the geometry shader (S703), outputting the point primitives which are used to generate the resulting joint histogram in a texture object attached to a frame buffer object (S704), computing an image similarity metric between the first volume and the second volume using the generated histogram (S705), and evaluating and optimizing the value of the similarity metric over a set of geometric transformations to register the volumes (S706).

The method may be performed by the geometry shader program in parallel on multiple input coordinates. In this way, multiple geometry shader threads may be simultaneously used to compute all of the vertices. The method can be performed repeatedly for registering a plurality of image volumes. Each of the point primitive computed by the geometry shader can be added in a texture object attached to a frame buffer object (e.g., using an additive blending function on the GPU).

The uploading of the volumes to the GPU may include storing intensities of the first volume and the second volume into 3D luminance texture objects on the GPU. The 3D luminance texture objects may be floating-point precision 3D textures. For example, a first floating-point precision 3D luminance texture object may be used to store the intensities of the first volume and a second floating-point precision 3D luminance texture object may be used store the intensities of the second volume. The intensities of both volumes may also be stored in a single texture object.

The uploading of the volumes to the GPU may include storing coordinate points of the first volume and coordinate points of the second volume into vertex buffer objects (VBOs) on the GPU. For example, a first VBO may be used to store the first volume coordinate points and a second VBO may be used store the second volume coordinate points. The volume coordinate points of both volumes may also be stored in a single VBO.

Each point primitive includes an intensity of the first volume coordinate point and an intensity of a corresponding mapped coordinate point in the second volume. For example, if the intensity of a first volume coordinate point is 129.73 and the intensity of the mapped coordinate point is 129.34, the vertex would be (129.73, 129.34). The intensities may range between any predefined minimum and maximum ranges (e.g., 0 to 1, 0 to 255, etc.).

A GPU can output points to an off-screen frame buffer or to an actual display. The GPU pipeline can be configured to output the pixels to a texture object by creating and binding (activating) the frame buffer object. GPU is configured by default to output values in the range 0 to 1. Clamping can be disabled in the GPU to enable the use of values superior to 1 and inferior to 0.

As discussed above in steps S702-S704, the GPU maps each coordinate of the first volume to a mapped coordinate in the second volume, determines vertices from intensities of the first volume coordinate points and intensities of the mapped coordinate points in the second volume, and then outputs the resulting pixels to a texture attached to a frame buffer object. These steps may be performed by a function (e.g., one written in the CG programming language) and the function may be executed by the geometry shader by linking or binding the function to the geometry shader and linking or binding the function to the 3D luminance textures, thereby enabling the function to access the above described coordinate intensities.

FIG. 8 illustrates exemplary pseudo code that may be used to implement the above described function. The pseudo code includes a geometry shader function 800, which receives an input coordinate parameter 801 (e.g., a first volume coordinate point), an input transformation parameter 802 (e.g., angles and/or translations), an intensity parameter of a first volume 803 (e.g., intensities of first volume in a 3D luminance texture), and an intensity parameter of a second volume 804 (e.g, intensities of second volume in a 3D luminance texture). The function 800 includes code 805 to map the first volume coordinate point to a mapped coordinate point in the second volume using the input transformation parameter 802. The function 800 further includes codes 806 and 807 to respectively retrieve the intensity of the first volume coordinate point and the intensity of the mapped coordinate point in the second volume. The function 800 further includes code 808, which receives these intensities as parameters and an increment count parameter 809 to output the data as a vertex to the frame buffer object.

Each of the primitive points generated by the geometry shader may affect a unique 2D bin in the resulting texture object. While the input intensities may be floating point values, the following example assumes use of integer values for ease of discussion. For example, intensity values ranging from 0 to 9 would generate 100 2D bins of 0.0, 0.1, . . . , 0.0-9.0, 9.1, . . . , 9.9. Each time a unique point primitive is output by the geometry shader, one of these bins can either be set or incremented. The GPU pipeline should be configured to perform additive updates when the bins are to be incremented. When all of the coordinate points of the first volume have been processed (e.g., when each corresponding vertex has been output to the resulting texture attached to a frame buffer)

in conjunction with a frame buffer object that configured in this additive manner, a joint histogram is generated in a texture object attached to a frame buffer.

The frame buffer may be configured to increment in integer units (e.g, by 1) or by fractions. For example, the increment count parameter 809 of code 808 could be modified to a fractional value (e.g. 0.5). In this way, a weight can be applied to each 2D bin to allow refinements to be made to the resulting joint histogram. Further, the function 800 can be modified to increment another 2D bin location in addition to the calculated one. For example, if previous experiences indicated that intensities at a 2D bin of (5,5) are typically associated with intensities at a 2D bin of (5,6), the function 800 could be modified to increment the (5,6) bin whenever the (5,5) bin is incremented.

In at least one embodiment of the present invention, the first volume and the second volume that were uploaded to the GPU were segmented using the above described optimum intensity threshold sets. For example, each of the first and second volumes may have been segmented respectively using optimum intensity threshold sets from a plurality of intensity threshold sets that maximize a variance between classes of each set. The step (704) of registering the first and second volumes may include generating mutual information from the joint histogram calculated by the GPU and registering the first image with the second image based on the mutual information. The generation of the mutual information and the registration may be performed on the CPU.

Figure 9:
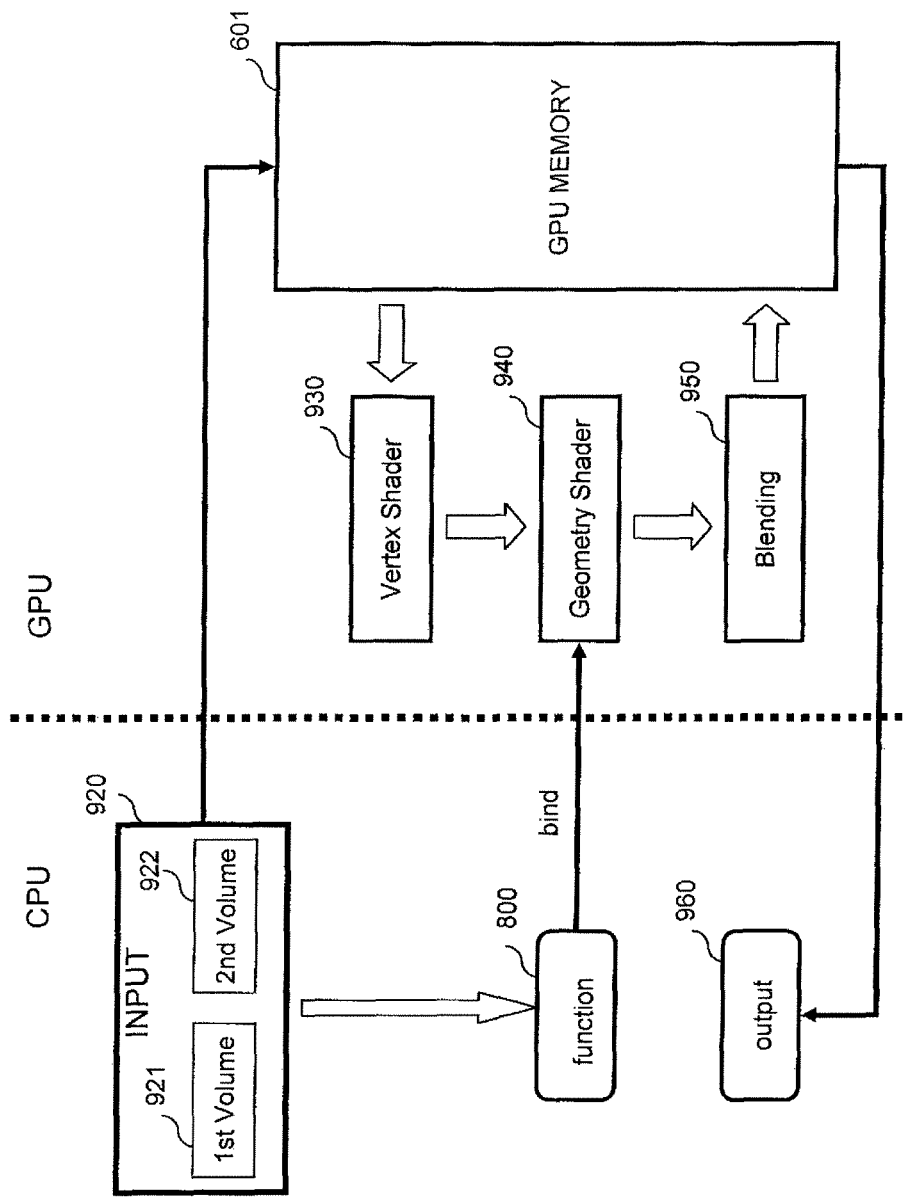
FIG. 9 illustrates an example of a computer system capable of implementing the methods and systems according to embodiments of the present invention.

FIG. 9 illustrates a system according to an exemplary embodiment of the present invention that may be used to perform the above described methods. The system shows an interaction between a CPU and a GPU. The CPU provides the input 920 of a first volume 921 and a second volume 922 to the GPU memory 601. The CPU also provides the function 800 (e.g., see FIG. 8) to the geometry shader 940. As described above, the GPU memory 601 may store the intensities of the volumes in 3D luminance textures and the coordinates of the volumes in VBOs. The pipeline of FIG. 6 shows that the first stage of certain GPU pipelines includes a vertex shading stage 602. The 3D luminance textures and VBOs can be sent to the vertex shader 930 and then passed from the vertex shader to the geometry shader 940. Once the function 800 is bound to the geometry shader 940, the shader 940 can perform the function 800 to generate all of the above described vertices. The blending facility 950 of the GPU can be used to combine the vertices into a joint intensity histogram in a frame buffer of the GPU. The frame buffer may be disposed in the GPU memory 601. The contents of the frame buffer (e.g., the joint histogram) may then be sent as output 960 to the CPU. The CPU may then use the received joint histogram to perform image registration on the two volumes (e.g., using the methods shown in FIGS. 1-3).

Figure 10:
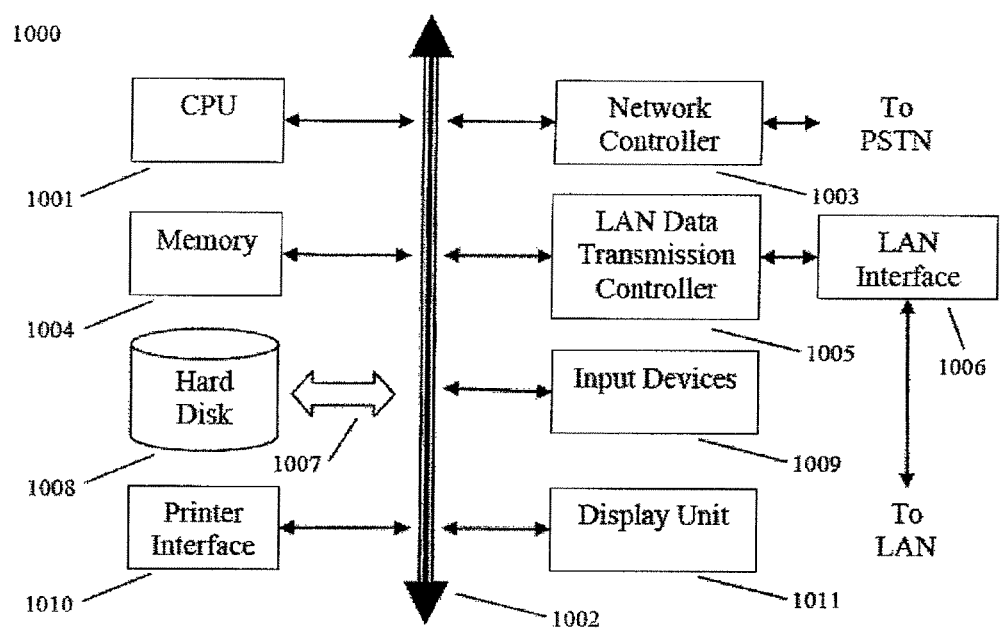
FIG. 10 illustrates an example of a computer system capable of implementing the methods and systems according to embodiments of the present invention.

FIG. 10 shows an example of a computer system, which may implement a method and system of the present disclosure. The system and methods of the present disclosure, or part of the system and methods, may be implemented in the form of a software application running on a computer system, for example, a mainframe, personal computer (PC), handheld computer, server, etc. For example, the segmentation unit 501 and the registration unit 502 of FIG. 5 may be implemented as software application(s) that perform the methods described above with reference to corresponding aspects of FIGS. 1-3. Further, the methods of FIGS. 7-8 may also be performed by applications. These software applications may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the methods described above with reference to FIGS. 1-9. For example, as described in FIG. 7, the CPU 1001 may upload volumes to the GPU, receive a joint histogram from the GPU, and then register the volumes with one another based on the received joint histogram (e.g., using the methods shown in FIGS. 1-3.

Embodiments of the present image are not limited to images of any particular format, size, or dimension. For example, the above methods and system may be applied to images of various imaging formats such as magnetic resonance image (MRI), computed tomography (CT), positron emission tomography (PET), etc. The images may be static images such as single dimensional (1D), 2D, 3D, or be moving images such as 1D+time (T), 2D+T, and 3D+T.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method of registering images, the method comprising:
for each image, determining an optimum intensity threshold set from a plurality of intensity threshold sets that maximizes a variance between classes of each set using a computer;
segmenting each image using the corresponding determined optimum intensity threshold set using the computer;
generating a joint histogram of at least two of the segmented images using the computer;
generating mutual information from the joint histogram using the computer; and
registering the at least two images based on the mutual information using the computer,
wherein the joint histogram is generated by a geometry shader of a graphical processing unit GPU of the computer in a texture object attached to a frame buffer of the GPU.

2. The method of claim 1, wherein determining the optimum intensity threshold set for each image comprises:
generating a variance for each intensity threshold set; and
selecting the intensity threshold set that has the highest corresponding variance as the optimum intensity threshold set.

3. The method of claim 1, wherein the thresholds of each intensity threshold set are pre-sorted and values of the thresholds of each intensity threshold set differ from one another.

4. The method of claim 2, wherein generating a variance for each intensity threshold set comprises:
for each class, determining a class occurrence probability from a probability distribution of intensity levels of the corresponding class;
determining a class mean level from the class occurrence probability;
determining a global mean from an entire range of intensity levels of the image and the probability distribution;
determining a value based on the class occurrence probability, the class mean level, and the global mean; and
summing the values to generate the variance.

5. The method of claim 4, wherein the class occurrence probability is read out of a look up table.

6. The method of claim 4, wherein determining the value comprises:
subtracting the global mean from the class mean level;
squaring a result of the subtraction; and
multiplying a result of the squaring by the class occurrence probability to generate the value.

7. The method of claim 4, wherein determining the probability distribution of the intensity levels comprises:
determining a frequency of occurrence of each level in the image;
determining a probability for each frequency by dividing the frequency by the number of pixels of the image; and
summing all of the probabilities to generate the probability distribution.

8. The method of claim 4, wherein determining the class mean level from the class occurrence probability comprises:
determining a value for each intensity level by multiplying the intensity level by the corresponding probability divided by the probability distribution; and
summing each of the values to generate the class mean level.

9. The method of claim 4, wherein determining the global mean comprises:
determining a value for each intensity level in the entire range by multiplying each intensity level by a probability of the intensity level occurring in the image; and
summing each of the values to generate the global mean.

10. The method of claim 2, wherein generating a variance for each intensity threshold set comprises:
for each class,
determining a class occurrence probability from a probability distribution of intensity levels of the corresponding class;
determining a class mean level from the class occurrence probability;
determining a value based on the class occurrence probability and the class mean level; and
summing the values to generate the variance.

11. The method of claim 10, wherein determining the value comprises:
squaring the class mean level; and
multiplying a result of the squaring by the class occurrence probability to generate the value.

12. The method of claim 1, wherein the generating of the mutual information is performed by a central processing unit CPU of the computer system separate from the GPU.

13. The method of claim 1, wherein the registering is performed by a central processing unit CPU of the computer system separate from the GPU.

14. The method of claim 1, wherein the generating of the mutual information and the registering are both performed by a central processing unit CPU of the computer system separate from the GPU.

15. The method of claim 1, wherein the optimum intensity threshold set corresponds to a plurality of classes, where each class indicates an intensity range and a single intensity value, wherein the segmenting of each image comprises:
determining which of the classes each intensity in the segmented image belongs based on the intensity ranges; and
replacing each intensity in the segmented image with the single intensity value of its determined class.

16. The method of claim 15, wherein at least one of the intensity ranges includes at least two different intensity values.

17. The method of claim 16, wherein the intensity ranges are unique from one another.

18. The method of claim 17, wherein the classes number at least three.

19. A computer program product to register images, said computer program product comprising:
a computer readable storage medium; and
program instructions to:
for each image, determine an optimum intensity threshold set from a plurality of intensity threshold sets that maximizes a variance between classes of each set;
segment each image using the corresponding determined optimum intensity threshold set;
generate a joint histogram of at least two of the segmented images;
generate mutual information from the joint histogram; and
register the at least two images based on the mutual information,
wherein the joint histogram is generated by a geometry shader of a graphical processing unit GPU in a texture object attached to a frame buffer of the GPU, and
wherein said program instructions are stored on said computer readable storage medium.

20. A method of registering images, the method comprising:
generating, by a geometry shader of a graphical processing unit GPU, a joint histogram of at least two segmented images in a texture object attached to a frame buffer of the GPU;
generating mutual information from the joint histogram; and
registering the at least two images based on the mutual information.

21. The method of claim 20, wherein prior to the generating of the join histogram the method comprises:
for each image, determining an optimum intensity threshold set from a plurality of intensity threshold sets that maximizes a variance between classes of each set; and
segmenting each image using the corresponding determined optimum intensity threshold to generate the segmented images.

22. The method of claim 21, wherein determining the optimum intensity threshold set for each image comprises:
generating a variance for each intensity threshold set; and
selecting the intensity threshold set that has the highest corresponding variance as the optimum intensity threshold set.

23. The method of claim 21, wherein the thresholds of each intensity threshold set are pre-sorted and values of the thresholds of each intensity threshold set differ from one another.

* * * * *